United States Patent [19]

Moser

[11] 3,795,369

[45] Mar. 5, 1974

[54] AUGER FEED GRANULATOR

[75] Inventor: Paul R. Moser, Geigertown, Pa.

[73] Assignee: Beloit Corporation, Beloit, Wis.

[22] Filed: Feb. 25, 1972

[21] Appl. No.: 229,304

[52] U.S. Cl............. 241/82.1, 241/73, 241/186 A, 241/241
[51] Int. Cl. ........................................ B02c 18/00
[58] Field of Search .........241/73, 241, 246, 186 A, 241/82.1, 82.4, 82.7, 222; 198/64, 213

[56] References Cited
UNITED STATES PATENTS

| 3,349,823 | 10/1967 | Stott | 241/73 |
| 2,963,086 | 12/1960 | Green | 198/64 |
| 3,419,223 | 12/1968 | Morin | 241/73 |
| 2,746,083 | 5/1956 | King | 198/213 |
| 3,547,358 | 12/1970 | Anderson | 241/73 |

FOREIGN PATENTS OR APPLICATIONS

| 678,088 | 8/1952 | Great Britain | 198/213 |

Primary Examiner—Donald G. Kelly
Assistant Examiner—Robert C. Watson
Attorney, Agent, or Firm—Parmelee, Miller, Welsh & Kratz

[57] ABSTRACT

An improved auger feed granulator apparatus for grinding thermoplastic waste to permit reuse of the thermoplastic material. The improved auger has a shear disc affixed at the discharge end of the auger, rotatable with the auger. A blocking bar extends between the terminal flight of the auger and the shear disc proximate the terminal end of the flight to prevent jamming of material between the terminal end of the flight and the disc. The granulator assembly includes a rotatable cutter blade within a cutting chamber disposed below the discharge end of the auger and closely spaced therefrom. The thermoplastic material is effectively forced into contact with the cutter blades for granulation, without any jamming or wrapping of material about the auger terminal end.

10 Claims, 3 Drawing Figures

PATENTED MAR 5 1974　　　　　　　　　　　　　　　3,795,369

AUGER FEED GRANULATOR

BACKGROUND OF THE INVENTION

Auger feed granulators are an important auxiliary piece of equipment for all plastic molding operations. A large quantity of reusable thermoplastic material is collected as residue for molding of thermoplastic articles. The material which solidifies in the lead-in runners of the mold, flashing about the mold seals, and imperfect molded parts are typical as such residue and are all reusable after grinding. An auger feed granulator is typically provided close to the molding machinery, with the runners and other such material being charged directly to the charging end of the auger, and thereby advanced to the granulator.

A common problem with such granulators is the tendency of the long plastic runners to wrap around the auger, principally at the discharge end between the rotating auger and the stationary hopper wall. The wrapping of runners at this point will jam and bind the auger as well as prevent discharge of the material into the cutting chamber.

The granulator assembly of the prior art is disposed below the discharge end of the auger and comprises a cutting chamber including a plurality of rotatable blades and stationary blades which granulate the plastic material which then exits through a screen at the bottom of the cutting chamber. It has been the practice to space the rotary cutter blades at a distance below the flight of the auger.

SUMMARY OF THE INVENTION

An improved auger feed granulator apparatus is provided for preventing wrapping or binding of thermoplastic material relative to the auger at the discharge end thereof. The apparatus comprises a rotatable auger having a helical flight extending from a central shaft, which auger advances the plastic material from the charging end of the auger to the discharge end. A shear disc is affixed at the discharge end of the auger. The disc is disposed normal to the longitudinal axis of the auger and is attached to the auger shaft and to the terminal of the helical flight, so that the disc rotates with the auger. A granulator assembly is disposed below the discharge end of the auger that includes a rotatable cutter blade within a cutting chamber. The granulator is disposed with the ends of the cutter blade describing an arc, when rotated, which closely approaches the cylinder of revolution described by the helical flight. The plastic material is thus prevented from wrapping about the auger, or jamming and binding at the discharge end of the auger, while the material is effectively forced into contact with the cutter blades for granulation.

A blocking bar is preferably disposed between the shear disc and the helical flight proximate the terminal of the flight to further prevent jamming of the material therebetween. The granulator preferably comprises a plurality of rotary cutter blades and a plurality of stationary cutter blades. The granulated material is passed through a screen below the cutter blades at the bottom of the cutting chamber.

The granulated material can then be reused directly for molding articles or mixed with virgin material for use.

DESCRIPTION OF THE PREFERRED EMBODIMENTS

Figure 1:
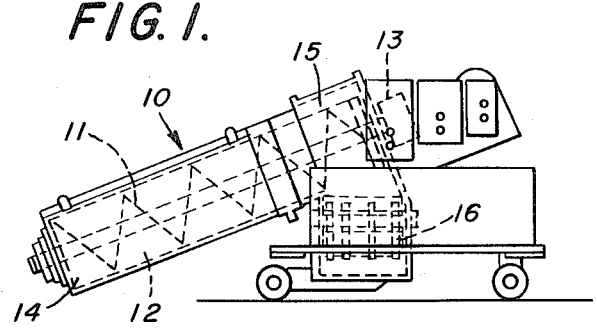
FIG. 1 is a schematic side elevational view of the auger feed granulator of the present invention showing the auger in an inclined position relative to the granulator assembly.

The invention can be best understood by reference to the exemplary embodiment of the invention shown in the drawings. The auger feed granulator 10 seen in FIG. 1 comprises a material advancing auger 11 disposed within auger hopper or chamber 12. Auger drive means 13 is generally indicated at the right-hand side of FIG. 1. The auger 11 is shown in an inclined configuration, but the auger can be disposed in a horizontal position as well, as is seen in FIG. 2.

The auger feed granulator 10 is typically positioned below or at the side of the molding machine, not shown, whereby thermoplastic runners discharged from the molding machine are dropped or conveyed into the charging end 14 of the auger 11. A side or top mounted receiving bin, not shown, may be associated with the charging end 14.

Figure 2:
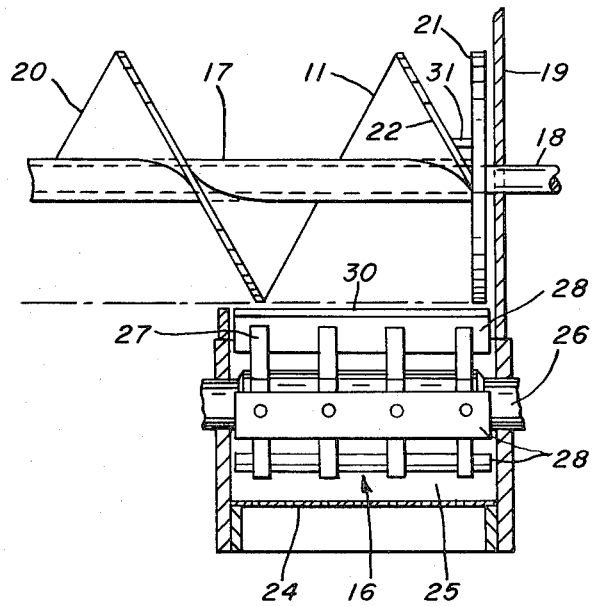
FIG. 2 is an enlarged view partly in section of the discharge end of the auger disposed in a horizontal position relative to the associated granulator assembly.

The auger advances the thermoplastic material as is well understood, to the discharge end 15 of the auger above the granulator assembly 16, which are both best seen in FIG. 2. The auger 11 includes a central tubular shaft 17 which fits over and is affixed to drive shaft 18, which passes through hopper end wall 19, with drive shaft 18 being connected to drive means 13. A helical flight 20 extends from the central shaft 17 along its length. Such a construction is conventionally used in granulators.

In the improved assembly of the present invention, a shear disc 21 is affixed to the central shaft 17 at the discharge end 15. The disc 21 is also affixed to the terminal end 22 of flight 20. The disc 21 is spaced from hopper end wall 19 a distance sufficient to permit rotation of disc 21 with the auger 11. The diameter of disc 21 is preferably approximately equal to the diameter of the helical flight 20. The diameter of disc 21 will also be limited by the top cover of the hopper, not shown.

The granulator assembly 16 is disposed below the discharge end of the auger 11. The side walls 23 and bottom screen 24 define a cutting chamber 25. The granulator drive shaft 26 and rotor 27 are rotated by conventional drive means, not shown. A plurality of demountable cutter blades 28 are mounted on the perimeter of rotor 27 in symmetrical relationship. Three such cutter blades 28 are shown here. Stationary cutter blades 29 extend from the side walls 23. The rotor 27 can comprise an open type rotor, which means that the rotor is not a solid piece, but rather has a plurality of spaced supports which extend radially from the drive shaft 26 to support the cutter blades 28.

The axis of drive shaft 26 of the granulator is preferably directed parallel to the longitudinal axis of the auger. The drive shaft 26 is preferably rotated in the direction opposed to the direction of auger rotation.

Figure 3:
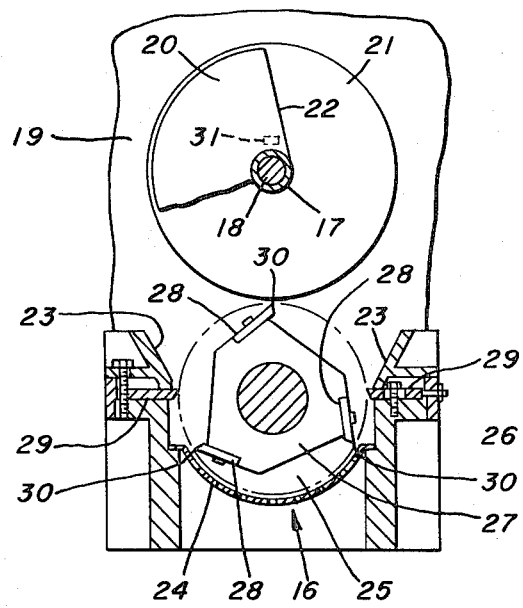
FIG. 3 is a part cross sectional view of FIG. 2 at the discharge end of the auger showing the auger and granulator.

In FIG. 3 the direction of rotation of shaft 26, and rotary cutter blades 28 is opposed to the rotary direction of the auger. If the auger is rotated counterclockwise, the granulator is disposed with the rotary cutter blades 28 rotating clockwise, and vice versa.

It has been discovered to be of particular importance in preventing wrapping of long plastic runners about the auger or binding of the material thereat, to very closely space the granulator with respect to the auger. The rotary cutter blades 28 are disposed so that the ends or tips 30 thereof describe an arc when the blades 28 are rotated which closely approaches the cylinder of rotation described by the helical flight 20. The spacing of the blade edge 30 from the helical flight is to be as close as the rotational tolerance permits. By way of example, the spacing is less than about one inch and is preferably about 0.125 inch, whereas the typical spacing for prior art devices is at least several inches.

It has been found that placing a blocking bar 31 as seen in FIGS. 2 and 3, further prevents jamming of plastic material between the terminal portion of the helical flight and the shear disc. The blocking bar 31 extends between the flight terminal end 22 and the shear disc 21. The blocking bar 31 is disposed at a position of from about one to several inches from the auger shaft 17, the specific dimensions depending upon the size and construction of the auger.

The prior art auger feed granulators were easily fouled by plastic runners which were more than several inches long. Such fouling or wrapping of runners about the auger could result in stopping of the auger, with bothersome downtime required to clear the auger. The improved auger feed granulator of the present invention permits use with plastic runners of any length.

The close spacing of the granulator assembly to the auger results in a compact lower profile unit which can be easily positioned close to the molding equipment which feeds the auger.

The granulator assembly can be varied as well known in the art to provide the desired particle size for the reground plastic material.

I claim:

1. In an improved auger feed granulator comprising a rotatable auger having a helical flight extending from a central shaft, which auger advances thermoplastic material from the charging end of the auger to the discharge end, and a granulator assembly disposed below the discharge end of the auger, the granulator assembly including a cutter chamber and a rotatable cutter blade, the improvement wherein a disc is affixed at the discharge end of the auger, said disc is attached to the auger shaft and the terminal of the helical flight to rotate therewith, and wherein the granulator assembly is disposed so that the end of the cutter blade describes an arc when rotated which is spaced within about one inch from the cylinder of revolution described by the helical flight, whereby the thermoplastic material is prevented from wrapping or binding at the discharge end of the auger, and the material is effectively forced into contact with the cutter blade for granulation.

2. The apparatus specified in claim 1, wherein the disc is disposed in a plane normal to the longitudinal axis of the auger.

3. The apparatus specified in claim 1, including a blocking bar extending from the auger flight to the disc proximate the terminal of the helical flight to further prevent the jamming of plastic material between the terminal of the spiral flight and the disc.

4. The apparatus specified in claim 1, wherein the diameter of the disc is approximately equal to the diameter of the helical flight of the auger.

5. The apparatus specified in claim 1, wherein the auger is inclined at a predetermined angle relative to the granulator assembly.

6. The apparatus specified in claim 1, wherein the auger is horizontally disposed, relative to the granulator assembly.

7. The apparatus specified in claim 1, wherein the granulator assembly comprises a plurality of rotatable cutter blades and a plurality of stationary cutter blades.

8. The apparatus specified in claim 1, wherein the spacing of the extending edges of the helical flight and the rotatable cutter blade is as close as rotational tolerance permits.

9. The apparatus specified in claim 1, wherein the longitudinal axis of the auger and the axis of rotation of the granulator blades are generally in the same direction.

10. The apparatus specified in claim 9, wherein the auger and the granulator blades are rotated in opposite directions.

* * * * *